(12) United States Patent
Lau et al.

(10) Patent No.: US 10,291,952 B2
(45) Date of Patent: May 14, 2019

(54) MULTIPLE-DEVICE MEDIA SWAP

(71) Applicant: Google Inc., Mountain View, CA (US)

(72) Inventors: Stephen Lau, Oakland, CA (US); Joon-Hee Jeon, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/441,340

(22) Filed: Feb. 24, 2017

(65) Prior Publication Data

US 2018/0249199 A1   Aug. 30, 2018

(51) Int. Cl.
*H04N 5/445* (2011.01)
*H04N 21/431* (2011.01)
*H04N 21/482* (2011.01)
*H04N 21/41* (2011.01)
*H04N 21/44* (2011.01)
*H04N 21/438* (2011.01)
*H04N 21/2187* (2011.01)
(Continued)

(52) U.S. Cl.
CPC ..... *H04N 21/4312* (2013.01); *H04N 21/2187* (2013.01); *H04N 21/25866* (2013.01); *H04N 21/26258* (2013.01); *H04N 21/2747* (2013.01); *H04N 21/4126* (2013.01); *H04N 21/42207* (2013.01); *H04N 21/42208* (2013.01); *H04N 21/42224* (2013.01); *H04N 21/4341* (2013.01); *H04N 21/4347* (2013.01); *H04N 21/4383* (2013.01); *H04N 21/44* (2013.01); *H04N 21/47202* (2013.01); *H04N 21/482* (2013.01); *H04N 21/6125* (2013.01)

(58) Field of Classification Search
CPC ...................... H04N 21/4312; H04N 21/4126
See application file for complete search history.

(56) References Cited

U.S. PATENT DOCUMENTS 6,097,441 A * 8/2000 Allport ............ H04N 21/43632
348/120
8,789,126 B1   7/2014 Nijim et al.
(Continued)

FOREIGN PATENT DOCUMENTS

WO   2010014210   2/2010
WO   2018156209   8/2018

OTHER PUBLICATIONS

"International Search Report and Written Opinion", PCT Application No. PCT/US2017/057644, dated Feb. 16, 2018, 9 pages.
(Continued)

*Primary Examiner* — Olugbenga O Idowu
(74) *Attorney, Agent, or Firm* — Colby Nipper

(57) ABSTRACT

In aspects of multiple-device media swap, a mobile device in a video content viewing system displays first video content on an integrated display of the device, and receives second video content without displaying the second video content. The mobile device continues to receive the second video content, without displaying the second video content, while the first video content is received and presented. The mobile device can initiate an instruction to swap from displaying the first video content to displaying the second video content on the integrated display of the mobile device. The instruction also initiates another device of the video content viewing system that is receiving both the first and second video content to swap from displaying the second video content to displaying the first video content.

20 Claims, 10 Drawing Sheets

(51) Int. Cl.
*H04N 21/258* (2011.01)
*H04N 21/262* (2011.01)
*H04N 21/2747* (2011.01)
*H04N 21/422* (2011.01)
*H04N 21/434* (2011.01)
*H04N 21/472* (2011.01)
*H04N 21/61* (2011.01)

(56) References Cited

U.S. PATENT DOCUMENTS

| | | |
|---|---|---|
| 9,247,175 B2 * | 1/2016 | Bennett .................. G06F 3/00 |
| 2007/0124765 A1 | 5/2007 | Bennett et al. |
| 2014/0071271 A1 * | 3/2014 | Altmann ................ H04N 5/268 |
| | | 348/143 |
| 2014/0368734 A1 | 12/2014 | Hoffert et al. |

OTHER PUBLICATIONS

"Written Opinion of the International Preliminary Examining Authority", PCT Application No. PCT/US2017/057644, dated Jan. 28, 2019, 8 pages.

* cited by examiner

US 10,291,952 B2

MULTIPLE-DEVICE MEDIA SWAP

FIELD OF INVENTION

This application generally relates to streaming video content, and switching between video content items that are displayed on multiple devices.

BACKGROUND

Content streaming is becoming more and more commonplace. Mobile devices, display devices, and other computing devices are rapidly evolving to accommodate the desire of users to stream content on their devices. As this technology improves, users may wish to stream multiple content items on one device, or stream multiple content items on multiple different devices. For example, users may wish to switch between two close football games that are approaching the end of each game. However, current techniques only allow for a single content stream at a device. In order to switch to a different content stream, a request is sent through a router to a server for the new content, and the new content is then sent back through the router to the requesting device. Then, the requesting device buffers the new content stream for display. These delays cause frustration for users, who desire fast and efficient switching between different items of content. These frustrations are aggravated with live streaming broadcasts, because the live event does not stop to wait for the delays following a user's request to switch to the new item of content.

SUMMARY

This document describes techniques and apparatuses for multiple-device media swap. By providing display devices with immediate access to multiple items of video content, users are no longer required to wait for requests to be sent, processed, and the requested video content to be buffered for display once it finally arrives at a display device. Instead, multiple items of video content are already being streamed to the display device to enable instantaneous switching between the multiple items of video content. By so doing, wait times when swapping between items of video content, even on multiple devices, are eliminated such that users no longer miss portions of video content when swapping.

In one aspect, a method is provided comprising: determining, at a device currently receiving two videos through one or more content streams and currently presenting a first of the two videos, that another device is currently presenting a second of the two videos and is currently receiving both of the two videos through the one or more content streams or another content stream; receiving an instruction, at the device, to swap content presentation between the device and the other device; responsive to the instruction to swap content presentation: presenting, at the device, the second of the two videos and ceasing to present the first of the two videos; and causing the other device to present the first of the two videos and cease to present the second of the two videos.

In another aspect, a mobile device implemented for swapping content presentation with another device is provided, the mobile device comprising: an integrated display configured to present content; a memory and processor system configured to execute a content display application that is implemented to: receive two videos concurrently through one or more content streams; present a first of the two videos on the integrated display; determine that another device is currently presenting a second of the two videos and is currently receiving both of the two videos through the one or more content streams or another content stream; receive an instruction, at the mobile device, to swap content presentation between the mobile device and the other device; responsive to the instruction to swap content presentation: present, at the mobile device, the second of the two videos and ceasing to present the first of the two videos; and cause the other device to present the first of the two videos and cease to present the second of the two videos.

In yet another aspect, a display device implemented for swapping content presentation with another device is provided, the display device configured to: determine, at the display device currently receiving two videos through one or more content streams and currently presenting a first of the two videos, that the other device is currently presenting a second of the two videos and is currently receiving both of the two videos through the one or more content streams or another content stream; receive an instruction, at the display device, to swap content presentation between the display device and the other device; responsive to the instruction to swap content presentation: present, at the display device, the second of the two videos and ceasing to present the first of the two videos; and cause the other device to present the first of the two videos and cease to present the second of the two videos.

In yet another aspect, a system implemented for swapping content presentation between two devices is provided, the display device including: means for receiving two videos at a device concurrently through one or more content streams; means for presenting a first of the two videos on an integrated display of the device; means for determining that another device is currently presenting a second of the two videos and is currently receiving both of the two videos through the one or more content streams or another content stream; means for receiving, at the device, an instruction to swap content presentation between the device and the other device; means for presenting, at the device, the second of the two videos and ceasing to present the first of the two videos responsive to the instruction to swap content presentation; and means for causing the other device to present the first of the two videos and cease to present the second of the two videos. The system may be implemented with means for any of the additional procedures or features described herein.

This summary is provided to introduce simplified concepts concerning multiple-device media swap, which is further described below in the Detailed Description. This summary is not intended to identify essential features of the claimed subject matter, nor is it intended for use in determining the scope of the claimed subject matter.

BRIEF DESCRIPTION OF THE DRAWINGS

Aspects of multiple-device media swap are described with reference to the following Figures. The same numbers may be used throughout to reference like features and components that are shown in the Figures.

DETAILED DESCRIPTION

Overview

Figure 1:
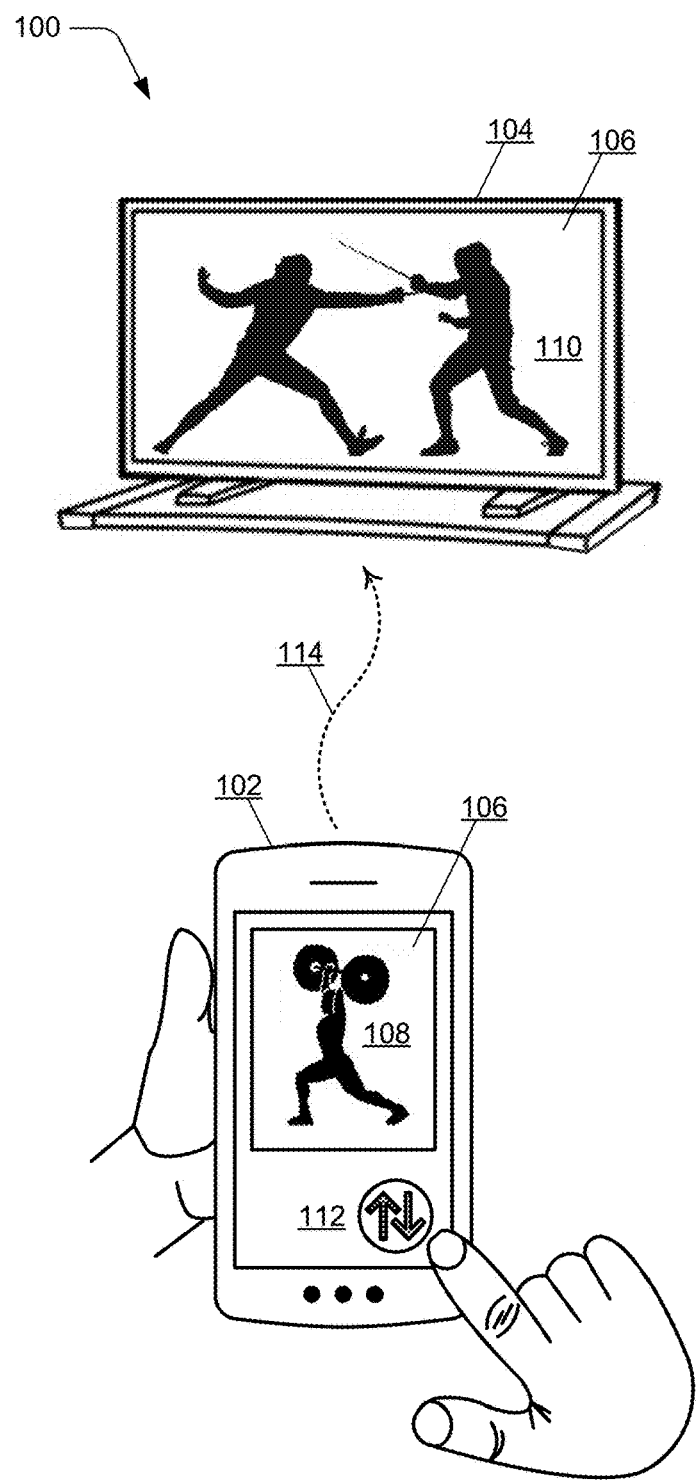
FIGS. 1-7 illustrate examples of multiple-device media swap implemented with multiple computing devices in accordance with the techniques described herein.

Multiple-device media swap is described, and the features enable a user to switch between multiple items of video content displayed on multiple devices while minimizing the wait time when a media swap is requested. The different devices can receive the multiple items of video content by way of one or a combination of various techniques, which are described in more detail below. Based on the way that the multiple items of video content are received at the different devices, different techniques may be used to swap from a first video content to a second video content in a manner that minimizes both wait time and enhances a user's experience when watching the multiple items of video content on the different devices.

In aspects of multiple-device media swap, a mobile device implemented as a first screen device in a video content viewing system displays first video content on an integrated display of the device, and receives second video content without displaying the second video content. The first screen device continues to receive the second video content, without displaying the second video content, while the first video content is received and displayed. The first screen device can initiate an instruction to swap from displaying the first video content to displaying the second video content on the integrated display of the device. The instruction also initiates a first screen device of the video content viewing system that is receiving both the first and second video content to swap from displaying the second video content to displaying the first video content.

The receipt of the first video content and the second video content at the two devices, and the subsequent switching of the display between the two video contents, may be implemented in various manners. In a first implementation, the mobile device (e.g., the first screen device) and the television display device (e.g., the second screen device) each receive two content streams from a video content service provider via a router in a network in which the devices are connected for wireless communication. A first content stream of the first video content is distributed to the mobile device, and a same first content stream of the first video content is distributed to the television display device. Similarly, a second content stream of the second video content is distributed to the mobile device, and a same second content stream of the second video content is distributed to the television display device. As discussed above, even though both content streams are being received at both of the devices, only one content stream is displayed on either device at any given time. Upon receiving the instruction to swap, each device switches from the video content that is currently being displayed to the alternate video content, and continues to receive both of the content streams of the video content.

In a second implementation, the mobile device and the television display device each receive one content stream from the video content service provider. However, in this case, the single content stream is made up of the first video content and the second video content. The single content stream can be customized by the video content service provider to include different items of content as the first video content and the second video content. Even though the mobile device receives both the first video content and the second video content in the single stream, a viewport on the integrated display of the mobile device limits the display of the content stream to the first video content. The second video content is outside of the viewable area of the viewport of the mobile device, and is therefore not viewable by the user. Similarly, a viewport of the television display device limits the display of the content stream to the second video content, and the first video content is outside of the viewable area of the viewport of the television display device. Upon receiving the instruction to swap, the mobile device and the television display device translate their respective viewports such that the mobile device displays the second video content and hides the first video content, and the television display device displays the first video content and hides the second video content.

In a third implementation, the computing device receives one content stream from the video content service provider, and the television display device receives two content streams from the video content service provider. Similar to the second implementation described above, the mobile device and the television display device is this example each receive a content stream that is made up of the first video content and the second video content. However, the television display device also receives another content stream of only the first video content, and displays the first video content from this additional content stream. The first video content displayed on the television display device may be displayed at a high resolution, for example.

The mobile device displays the content stream with both the first and second video content so that the user can view both the first video content and the second video content at the same time on the integrated display of the mobile device. The mobile device can receive a user input, such as a touch input on the display to select the second video content, and an instruction to swap the video content being displayed on the television display device is initiated. Upon receiving the instruction to swap the display of the video content, the television display device switches to the content stream that includes both the first and second video content, but only displays the second video content in the viewport of the television display device and the first video content is no longer displayed. When this switch occurs, the second video content may be displayed at a lower resolution to accommodate the first and second video content arriving at the television display device in the single content stream.

Additionally in response to the instruction to swap received at the mobile device to swap the display of the video content on the television display device, a request can be sent to the video content service provider to send a content stream with the second video content to the television display device in place of the content stream that only includes the first video content. When the content stream with the second video content is received at the television display device, the content stream with the second video content can replace the content stream that includes the first and second video content on the display, such as at a higher resolution. This technique allows for nearly instantaneous switching between the first and second video content, with only a small delay for display of a higher resolution content stream that includes the second video content.

While features and concepts of multiple-device media swap can be implemented in any number of different devices, systems, networks, environments, and/or configurations, aspects of multiple-device media swap are described in the context of the following example devices, systems, and methods.

Example Systems

FIG. 1 illustrates an example video content viewing system 100 in which aspects of multiple-device media swap can be implemented with a mobile device 102 and a television display device 104. The example system 100 includes the mobile device 102, shown as a mobile phone, and generally referred to herein as the first screen device of the system. The example system also includes the television display device 104, shown as being remote from the mobile device 102, and generally referred to herein as the second screen device in the system. Although generally referred to as a television or television device, the television display device 104 represents any type of display panel, display device, computer display, smart television, and the like that can receive, process, and display streaming video content, such as live television content and recorded video content. Further, the mobile device 102 is representative of any type of computing device that may be utilized as a second screen device in the video content viewing system 100, such as described with reference to the computing device shown in FIG. 8.

The mobile device 102 and the television display device 104 can be configured to communicate with one another through any available communication technique. For example, the mobile device 102 and the television display 104 can be configured to send and receive signals from different wireless radio systems, such as for Wi-Fi, Bluetooth™, Mobile Broadband, LTE, or other wireless communication system or format.

Further, any combination of computing devices may be used in the example system 100, such as tablets, desktop computers, laptop computers, projection display devices, wearable devices, and so forth. As detailed in the system description shown in FIG. 8, the mobile device 102 and/or the television display device 104 can display a content viewing interface 106 of a content display application that is implemented by a computing device. For example, many different types of computer applications utilize or implement content viewing features or functions that provide for viewing, recording, pausing, rewinding, zooming, or even editing video content, such as live streaming applications, video on demand (VOD) applications, social networking applications, video security applications, and so on. The content viewing interface 106 may take a variety of forms providing various functionalities, which can be based on the particular device on which the content viewing interface 106 is displayed. The content viewing interface 106 can be implemented, for example, by a software application maintained by an operating system of the television display device 104 and/or the mobile device 102. In another example, the content viewing interface 106 can be implemented by a software application maintained by an operating system of a streaming device (not pictured) connected to the television display device 106.

In this example system 100, the content viewing interface 106 on the integrated display of the mobile device 102 displays a first video content 108, such as a streaming live video, for instance. Similarly, the content viewing interface 106 on the television display device 104 displays a second video content 110, which may also be a live video stream. While the respective devices 102 and 104 are displaying these two different video contents 108 and 110, a user may wish to swap the video content that is being displayed on each of the respective devices with each other. For example, the user may be watching the fencing match in the second video content 110 on the television display device 104, which may go on for some amount time. The user is also interested in the weightlifting event that is being streamed on the mobile device 102 in the first video content 108, but is aware that the lifts in the weightlifting event take place intermittently and only last several seconds each. The user may then notice that a lift is about to take place in the first video content 108 on the mobile device 102, and the user can swap which device is displaying the first video content 108, such as to have the lift displayed on the larger screen of the television display device 104 rather than on the smaller screen of the mobile device 102.

To initiate the media swap, the user can select a user-selectable control 112 that is displayed in the content viewing interface 106 on the mobile device 102. In the system depicted at 100, the user-selectable control 112 is only present in the content viewing interface 106 of the mobile device 102; however, the user-selectable control may be implemented on any suitable device as part of multiple-device media swap. The user-selectable control 112 may be configured as an icon that is selectable in a touch interface, such as in the mobile device 102. The user-selectable control may, alternatively or additionally, be another type of control input, such as a button on a remote control, a button on keyboard, an icon selectable using a mouse in a user interface, and so forth.

An indication 114 of the media swap is communicated from the mobile device 102 to the television display device 104. The indication 114 is a signal communicated between the mobile device 102 and the television display device 104 via one or more of the communication channels discussed above, such as wireless radio systems, Wi-Fi, Bluetooth™, Mobile Broadband, LTE, or any other wireless communication system or format. The indication 114 is sent upon the receipt of the selection of the user-selectable control 112. The indication 114 causes the first video content 108 to be displayed on the television display device 104 in place of the second video content 110, and causes the second video content 110 to be displayed on the mobile device 102.

In one example, the media swap is executed by the mobile device 102 switching from presenting the first video content 108 being delivered to the mobile device in a first content stream to displaying the second video content 110, which is also being delivered to the mobile device in a second content stream, but is not displayed after being delivered to the mobile device. Similarly, the television display device 104 receives both the first video content 108 and the second video content 110 in two separate content streams, but only presents the second video content 110 initially. Thus, the selection of the user-selectable control 112 causes the mobile device 102 to swap from presenting the first video content 108 being received in the first content stream to presenting the second video content 110 being received in the second content stream approximately instantaneously, without having to send a request to a remote server to fetch the second video content 110. Further, the indication 114 sent from the mobile device 102 to the television display device 104 can be a relatively small amount of data communicated between the two devices, because only an indication is needed to instruct the television display device 104 to swap from presenting the second video content 110 and present the first video content 108, rather than sending an entire video stream or content stream from one device to the other. According to techniques described herein, the television display device 104 is already receiving both a content stream containing the first video content 108 and a content stream containing the second video content 110. Upon receiving the indication 114, the television display device swaps from presenting the second video content 110 being received in the second content stream to presenting the first video content 108 being received in the first content stream approximately instantaneously, without having to send a request to a remote server to fetch the first video content 108.

In the example depicted in the system 100, the weightlifting event displayed in the first video content 108 will be displayed on the television display device 104 in place of the fencing shown in the second video content 110. Further, when the user selects the user-selectable control 112, the content interface 106 on the mobile device 102 will switch from displaying the first video content 108 to display the second video content 110 so that the user can continue to watch the fencing match on the mobile device 102. In this example, the user may want to switch back to watching the fencing match of the second video content 110 when the lift of the first video content 108 is complete. The user can again select the control 112 to swap which device is displaying the first video content 108 and the second video content 110, returning the fencing match to be displayed on the television display device 104 and the weightlifting event to be displayed on the mobile device 102.

In alternative implementations, the weightlifting event of the first video content 108 may continue to be displayed on the mobile device 102 in response to the control 112 being selected by the user. Both the mobile device 102 and the television display device 104 continue to receive both the first video content 108 and the second video content 110 in respective content streams as described above, but in this example, the user may wish to have the weightlifting event of the first video content 108 displayed on both devices at once. In another example, a different instance of video content, other than the first video content 108 or the second video content 110, may replace the first video content 108 that is being displayed on the mobile device 102 when the control 112 is selected. Alternative implementations, including these examples, may be configured by the user in an application that presents the content viewing interface 106, giving users the ability to customize how many content streams the mobile device 102 and the television display device 104 receive and what actions take place in response to selection of the control 112.

Figure 2:
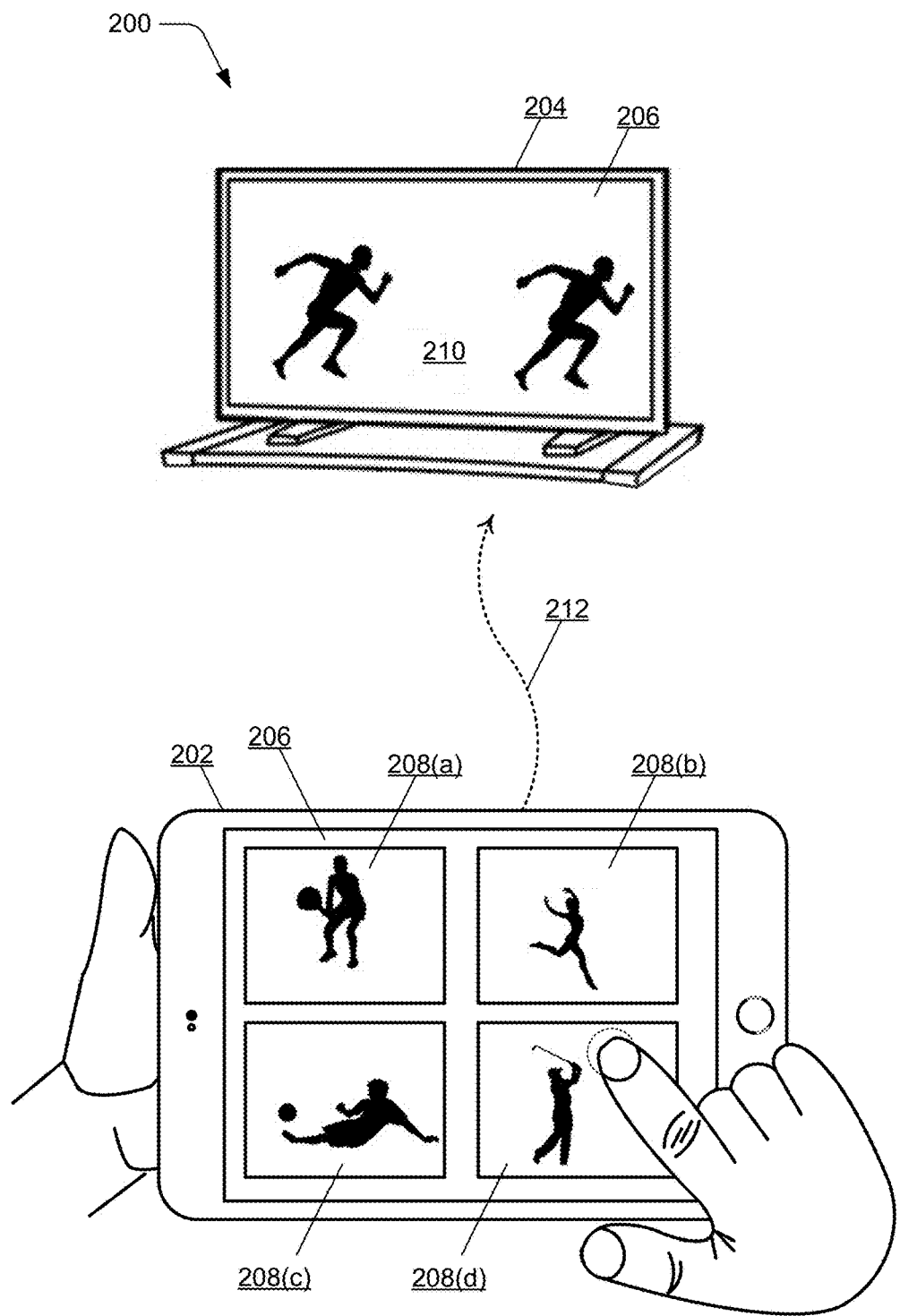

FIG. 2 illustrates another example 200 of multiple-device media swap implemented with a tablet 202 and a television 204 shown in this example. Similar to the discussion of FIG. 1, however, any combination of devices may be used in addition to or in place of the tablet 202 and the television 204. Additionally, the tablet 202 and/or the television 204 can display a content viewing interface 206 of a computer application that is implemented by a computing device. Like the discussion of the content viewing interface 106 of FIG. 1, the content viewing interface 206 can be implemented, for example, by a software application maintained by an operating system of the television 204 and/or the tablet 202. In another example, the content viewing interface 206 can be implemented by a software application maintained by an operating system of a streaming device (not pictured) connected to the television 206. In this example 200, the content viewing interface 206 of the tablet 202 has been adapted to suit the characteristics and capabilities of the tablet. The content viewing interface 206 displays a first video content 208(a)-(d) on the integrated display of the tablet 202. As discussed in greater detail below, the first video content 208 can be a single content stream received from a video content service provider, or can be four separate content streams received from the video content service provider. The first video content 208 can be live streaming videos, recorded on-demand video content, or a combination of different types of video content. The content viewing interface 206 of the television 204 also displays a second video content 210.

In this example 200, the user may be watching several events that are happening simultaneously, such as is common when the Olympics are taking place. Hoping to watch every event during the Olympics, the user may choose to have track and field in the second video content 210 displayed on the television 204, with four other live events displayed in the first video stream 208(a)-(d). Upon conclusion of the particular track and field event in the second video content 210, the user may want to watch a different sport on television 204 while there is a break in the action in track and field. Using a touch screen of the tablet 202, the user can select the golf event that is taking place in the first video content 208(d) to be swapped with the track and field event on television 204.

An indication 212 of the media swap is communicated to the television 204, which causes the golf event of the first video content 208(d) to be displayed on the television 204 in place of the track and field in the second video content 210. Similar to the indication 114 of FIG. 1, the indication 212 is a signal communicated between the tablet 202 and the television 204 via one or more of the communication channels discussed above, such as wireless radio systems, Wi-Fi, Bluetooth™, Mobile Broadband, LTE, or any other wireless communication system or format. In this case, the indication 212 includes an expression of not only the user's desire to swap between different media content items, but also which media content item is desired to be displayed on the television 204. The indication 212 can be communicated in response to the user selecting the golf event that is taking place in the first video content 208(d) on a touch screen of the tablet 202, for instance.

In one example, the tablet 202 can receive a single content stream that includes the four items of video content 208(a)-(d). The single content stream can be generated by a remote service provider (not pictured), and customized by the user to include desired items of video content. At the same time, the television 204 can receive two content streams: a first content stream that includes the second video content 210 which is present on a display of the television 204; and a second content stream that includes the items of video content 208(a)-(d) generated by the remote service provider, without presenting this content stream initially. When the tablet 202 receives the user selection of the golf event of the first video content 208(d), the indication 212 sent from the tablet to the television 204 causes the television to switch from presenting the second video content 210 to presenting the golf event of the first video content 208(d) included in the second content stream.

Rather than displaying all four items of video content 208(a)-(d) included in the second content stream in response to the instruction to swap, the television can "zoom in" to the video content 208(d) such that only the video content 208(d) is visible in the display area of the television 204. While this may cause the video content 208(d) to be displayed at a lower resolution, this allows the swap between the items of media content to happen approximately instantaneously because the second content stream is already present at the television 204. Additionally in response to the user selection of the video content 208(d) by the user, another request can be sent either by the tablet 202 or the television 204 for a single content stream containing only the video content 208(d) from the service provider. When this single content stream that contains only the video content 208(d) is received at the television 204, it can replace the lower-resolution version of the video content 208(d) on the display of the television 204 automatically. While the user may experience a few moments of resolution loss of the video content 208(d) while the request for a single stream containing the video content 208(d) is sent, the swap between different items of video content is still executed approximately instantaneously such that the user does not miss any video experience.

In implementations, the track and field in the second video content 210 may replace the golf in the first video content 208(d) in the content viewing interface 206 on the tablet 202. This may occur by the service provider generating a new custom content stream to deliver to the tablet 202 in response to the request to swap items of video content, although any combination of the techniques described herein may be used to implement replacing the golf event in the first video content 208(d) with the second video content 201 on the content viewing interface 206 of the tablet 202. In this case, the user can easily tell when another track and field event is about to start, and can select the track and field using the touch screen of the tablet 202 to again display the track and field content on the television 204. Alternatively or in addition, the user may wish to select one of the other events in the first video content 208(a)-(c) to be displayed on the television 204, and can do so using the touch screen of the tablet 202. Upon selection of one of the other events in the first video content 208(a)-(c), an indication 212 of the media swap is communicated to the television 204 based on the selected event in the first video content 208(a)-(c), and the selected event is displayed on the television 204.

Figure 3:
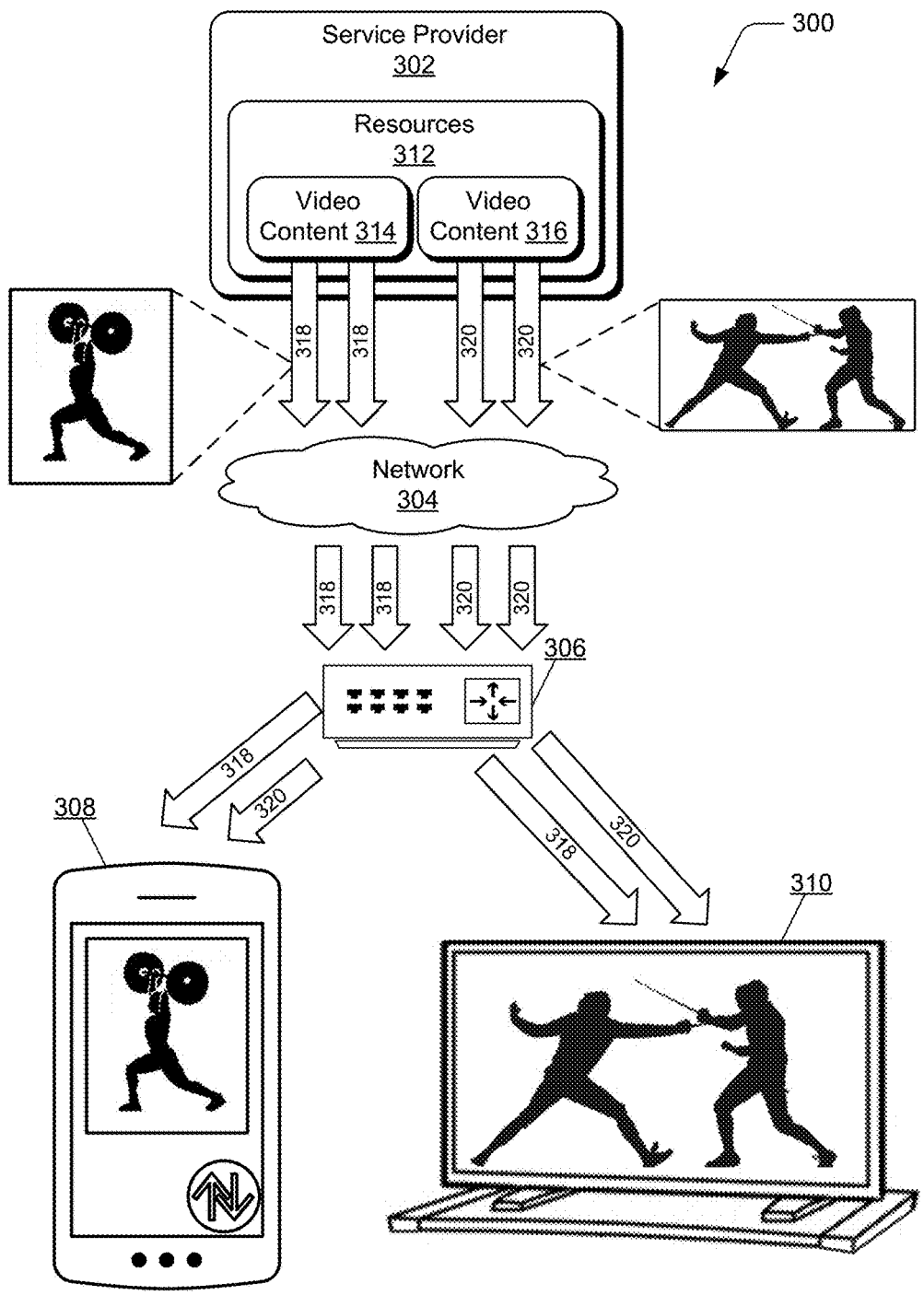

FIG. 3 illustrates an example system 300 for implementing multiple-device media swap including a service provider 302 (e.g., a video content service provider), a network 304, a router device 306, a mobile phone 308, and a television 310. Although a mobile phone 308 and a television are detailed in the example system 300, any of the devices described herein may be implemented in the example system 300. The mobile phone 308 and the television 310 may be communicatively coupled via the router 306 and the network 304 to the service provider 302. The service provider 302 enables the mobile phone 308 and the television 310 to access and interact with various resources 312 made available by the service provider 302. The television 310 may be communicatively coupled to the router directly (e.g., via an Ethernet connection), through a Wi-Fi connection, or via a streaming device attached to the television in order to access the service provider 302 by way of the network 304. Further, the mobile phone 308 and the television 310 are communicatively coupled to one another via one or more of the communication channels discussed above, such as wireless radio systems, Wi-Fi, Bluetooth™, Mobile Broadband, LTE, or any other wireless communication system or format.

The resources 312 can include any suitable combination of content and/or services typically made available over a network by one or more service providers. For instance, content can include various combinations of text, video, advertisements, audio, multi-media streams, animations, images, webpages, and the like. Some examples of services include, but are not limited to, a content viewing service, an online computing service (e.g., "cloud" computing), an authentication service, web-based applications, a file storage and collaboration service, a search service, messaging services such as email, text, and/or instant messaging, and a social networking service. The resources 312 can also include video content 314 and video content 316 as shown.

As shown in the example system 300, the video content 314 can be distributed from the service provider 302 via the network 304 to the router 306 as a first set of two content streams 318. That is, the first two content streams 318 with the same content in each content stream are sent from the service provider 302 to the router 306 via the network 304. Similarly, the video content 316 can be distributed from the service provider 302 via the network 304 to the router 306 using a second two content streams 320. While two content streams are depicted in the example system 300, any number of content streams may be distributed from the service provider 302, according to a number of devices in a system implementing multiple-device media swap, a number of video content items selected to be streamed by a user, and so forth.

The first two content streams 318 and the second two content streams 320 can be received at the router 306 approximately simultaneously. Once the four content streams 318 and 320 arrive at the router 306, the router 306 can direct particular content streams to the different devices that are in communication with the router 306. In particular, the router 306 directs one content stream including a first item of video content to each available device, a second content stream including a second item of video content to each available device, and so on. In this way, each device included in a system receives individual content streams for each requested item of video content. In this example, the router 306 directs one of the first two content streams 318 to the mobile phone 308 and directs the other one of the first two content streams 318 to the television 310. The router 306 also directs one of the second two content streams 320 to the mobile phone 308 and the other one of the second two content streams 320 to the television 310.

Even though the mobile phone 308 and the television 310 are each receiving two different content streams, the mobile phone 308 and the television 310 display only one of the two streams. For example, the mobile phone 308 only displays the first content stream 318 that contains the video content 314, such as the weightlifting event. The second content stream 320 that contains the video content 316 is not displayed at the mobile phone 308. Similarly, the television 310 only displays the second content stream 320 that contains the video content 316, such as the fencing match. The first content stream 318 that contains the video content 314 is not displayed at the television 310.

In aspects, the content streams that are received by the mobile phone 308 and the television 310, but that are not being displayed, can be removed from memory of the mobile phone before being processed or buffered. For example, when both content streams 318 and 320 arrive at the mobile phone 308, only the first content stream 318 is directed to memory of the mobile phone 308. The second content stream 320 is received at the mobile phone 308, but is not buffered for processing and display. The first content stream 318 continues to be buffered and output on the integrated display of the mobile phone 308. Only storing and buffering one of the two content streams at the mobile phone 308 reduces the processing resources needed to display the video content 314. In a similar fashion, only the second content stream 320 is stored in memory of the television 310 and buffered, while the first content stream 318 that is not being displayed is not buffered after being received at the television 310.

Providing two different video content items using four streams allows for immediate switching between the two video content items. This technique eliminates the need to send a request from a device to the service provider 302 through the network, wait for the request to be answered, and then process and buffer the received video content. As noted above with reference to the example described in FIG. 1, the user can select the user-selectable control 112 to swap the first video content 108 that is displayed on the mobile device 102 with the second video content 110 that is displayed on the television display device 104. Using the techniques described with reference to FIG. 3 to distribute video content to the mobile phone 102 and to the television 104, this swap of video content can take place immediately because both sets of video content are already being streamed to both the mobile phone 102 and to the television 104.

Particularly, when a request to swap is received, the mobile device 102 is able to terminate processing and buffering the first video content 108 at the next frame that was going to be processed and buffered. Then, the mobile device 102 replaces the first video content 108 with the second video content 110 at the next frame of the second video content 110 that is received and begins processing and buffering the second video content 110 for display on the mobile device. Similarly, the television display device 104 terminates processing and buffering of the second video content 110 at the next frame that was going to be processed and buffered at the television display device when the television display device receives the indication 114 to swap. Then, the television display device 104 replaces the second video content 110 with the first video content 108 at the next frame of the first video content 108 that is received and begins processing and buffering the first video content 108 for display on the television display device. This is especially useful when streaming live video content, as users do not want to miss parts of the live content while waiting for the arrival of requested content on their devices after a media swap has been initiated.

If the user does choose to swap between the video content 314 and the video content 316 in the example system 300, both of the devices can switch from one stream to another to display. For example, the mobile phone 308 can start with displaying the video content 314 using the first content stream 318. In response to a request to swap video content, the mobile phone 308 displays the video content 316 using the second content stream 320. In a similar fashion, the television 310 can begin by displaying the video content 316 using the second content stream 320, and in response to the indication to swap video content received from the mobile phone 308, display the video content 316 using the first content stream 318. After the mobile phone 308 and the television 310 swap which content each are displaying, both devices 308 and 310 continue to receive both content streams 318 and 320. Accordingly, if the user decides to switch back to the original configuration of which device displays which content, this can take place without either device having to request content, wait for content to be received, process, and buffer the respective video content for each device.

Figure 4:
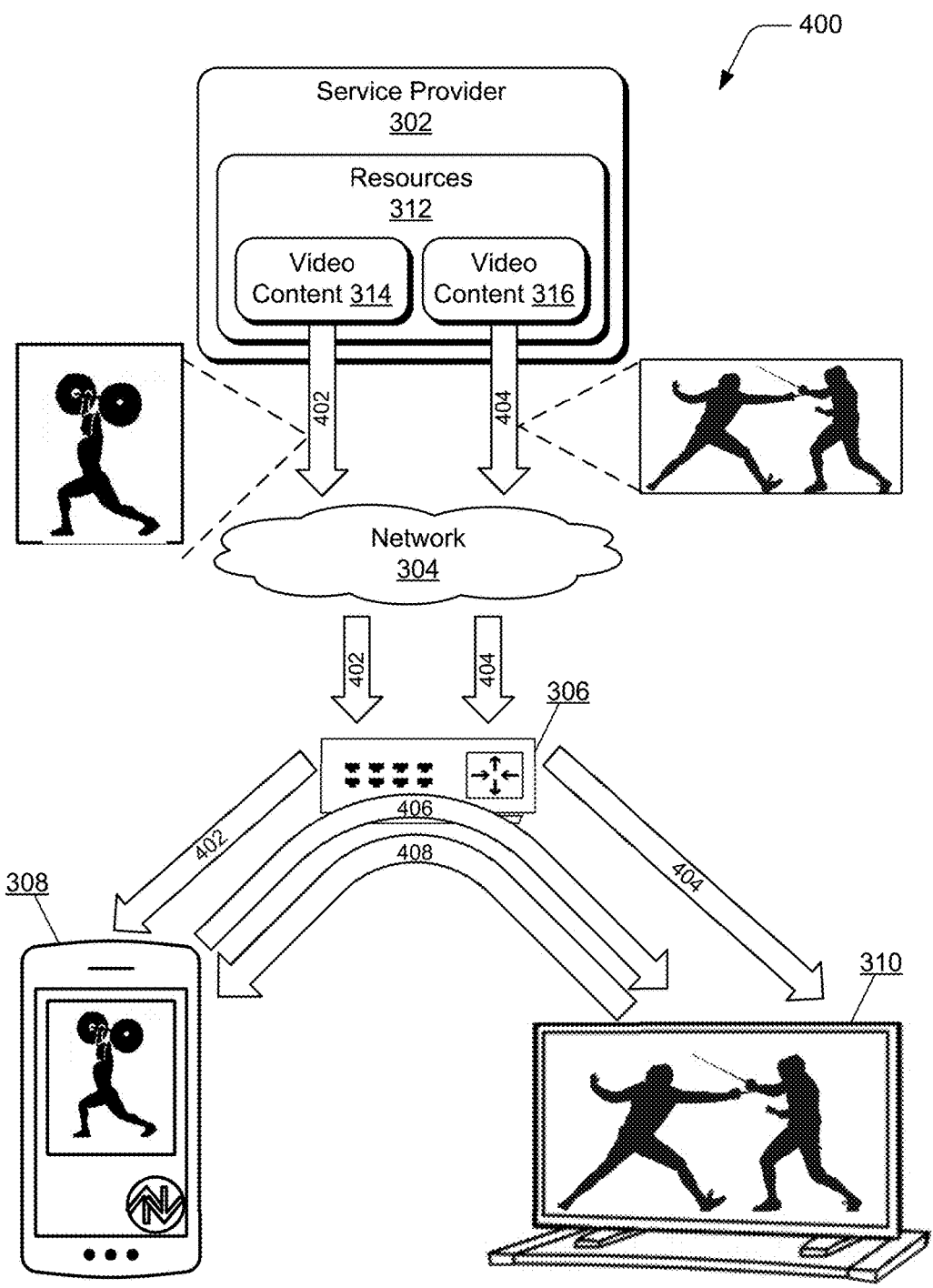

FIG. 4 illustrates another example system 400 for implementing multiple-device media swap. The example system 400 includes the service provider 302, network 304, router device 306, mobile phone 308, and television 310 as described in relation to the example system 300. As discussed above, the mobile phone 308 and the television 310 may be communicatively coupled via the router 306 and the network 304 to the service provider 302. The service provider 302 enables the mobile phone 308 and the television 310 to access and interact with various resources 312 made available by the service provider 302, including but not limited to the video content 314 and the video content 316. The television 310 may be communicatively coupled to the router directly (e.g., via an Ethernet connection), through a Wi-Fi connection, or via a streaming device attached to the television in order to access the service provider 302 by way of the network 304. Further, the mobile phone 308 and the television 310 are communicatively coupled to one another via one or more of the communication channels discussed above, such as wireless radio systems, Wi-Fi, Bluetooth™, Mobile Broadband, LTE, or any other wireless communication system or format.

In the example system 400, the video content 314 is distributed from the service provider 302 via the network 304 to the router 306, but in this example, only one content stream 402 is sent. Additionally, one content stream 404 that includes the video content 316 is distributed from the service provider 302 via the network 304 to the router 306. When the content streams 402 and 404 reach the router 306, the router can direct each content stream to an appropriate device. In this case, the router 306 directs the content stream 402 to the mobile phone 308 and directs the content stream 404 to the television 310. The mobile phone 308 then displays the video content 314 from the content stream 402, and the television 310 displays the video content 316 from the content stream 404.

In order to provide the mobile phone 308 and the television 310 with the ability to switch between the two instances of video content 314 and 316, the example system 400 provides a proxy mechanism that exists between the mobile phone 308, the television 310, and the router device 306. Rather than receiving a duplicate content stream from the service provider 302, each of the devices 308 and 310 forward the content stream that they receive to the other by way of the router 306. For example, after receiving the content stream 402 that includes the video content 314, the mobile phone 308 forwards the video content 314 in a content stream 406 back through the router 306 to the television 310. Likewise, the television 310 receives the content stream 404 that includes the video content 316 and forwards the video content 316 in a content stream 408 back through the router 306 to the mobile phone 308. This forwarding can simply be an instruction to the router 306 to send the video content 314 in the content stream 406 to the television 310 rather than the mobile phone 308. Other manners may instead be used to forward the video content 314, such as transmitting the content stream 406 to the television 310 wirelessly or through wired communication, in the various manners set forth above.

Similar to the discussion above, the devices 308 and 310 do not need to store, process, or buffer the stream that includes video content that the respective device is not currently displaying. When the mobile phone 308 receives the content stream 408 that includes the video content 316, it does not store or buffer the video content 316. Similarly, when the television 310 receives the content stream 406 that includes the video content 314, it does not store or buffer the video content 314. This allows the devices 308 and 310 to devote memory and processing power to other activities taking place at the devices.

Nevertheless, continuously receiving the alternate content stream allows the devices 308 and 310 to swap between the video content 314 and 316 almost instantaneously. When the mobile phone 308 receives an indication to swap from the video content 314 to the video content 316, the mobile phone 308 can switch over to displaying the video content 316 coming from the content stream 408. Further, when the television 310 receives the indication to swap from the video content 316 to the video content 314, the television 310 can switch over to displaying the video content 314 coming from the content stream 406. Should another indication to swap be received, the mobile phone 308 returns to displaying the video content 314 from the content stream 402, and the television 310 returns to displaying the video content 316 from the content stream 404.

Figure 5:
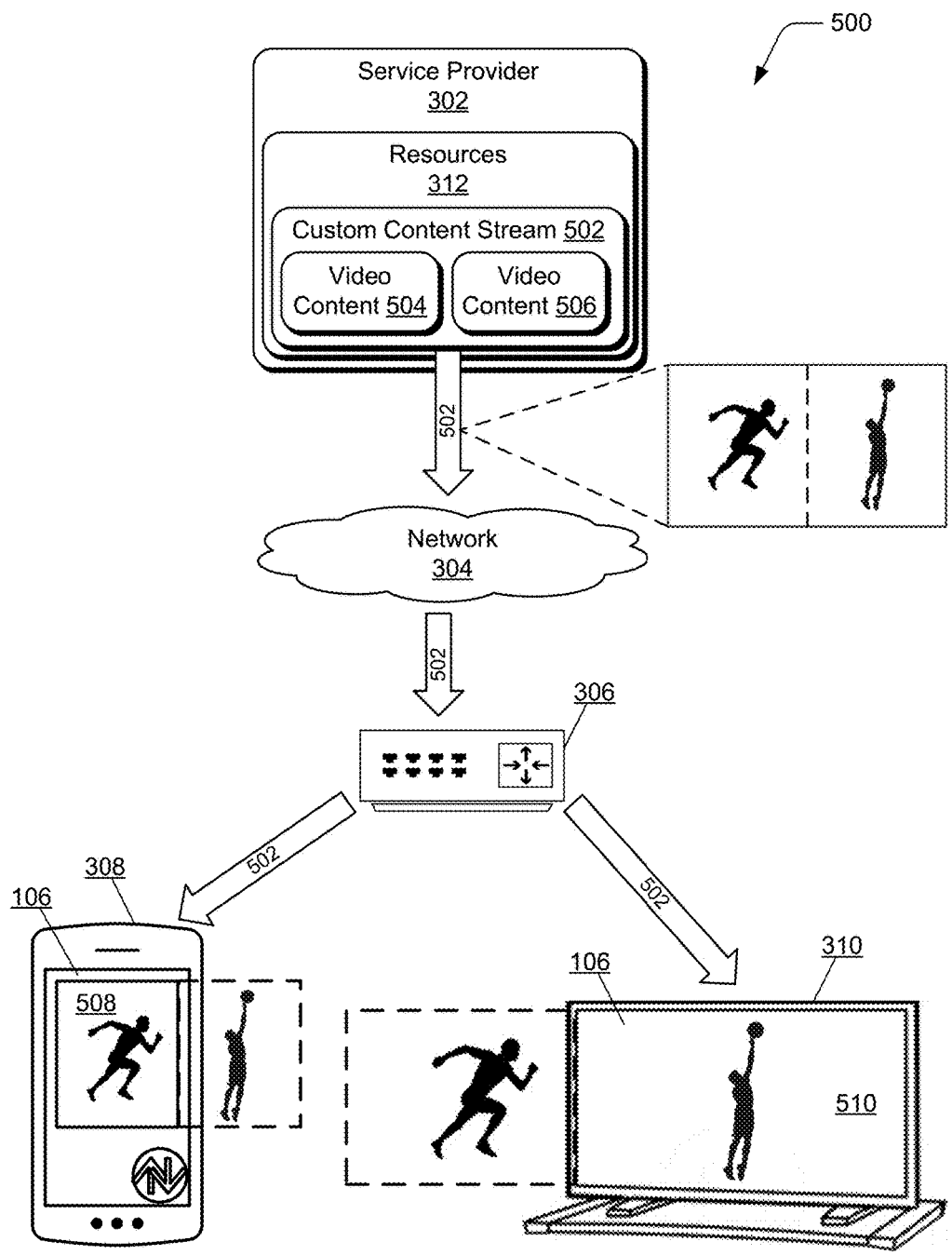

FIG. 5 illustrates another example system 500 for implementing multiple-device media swap. The example system 500 includes the service provider 302, network 304, router device 306, mobile phone 308, and television 310 as described in relation to the example system 300. As discussed above, the mobile phone 308 and the television 310 may be communicatively coupled via the router device 306 and the network 304 to the service provider 302. The service provider 302 enables the mobile phone 308 and the television 310 to access and interact with various resources 312 made available by the service provider 302.

In the example system 500, the resources 312 are shown as including a custom content stream 502. The custom content stream 502 can be generated by the service provider 302 to include two (or more) items of video content, in this case video content 504 and video content 506. The custom content stream 502 comprises a single merged video of the video content 504 and the video content 506 together. Merging can be implemented by stitching a frame from the video content 504 and a frame from the video content 506 together into a single frame and repeating as the frames of both video contents continue. The single frames that include one frame of the video content 504 and the video content 506 is used as the custom content stream 502.

The custom content stream 502 is sent from the service provider 302 via the network 304 to the router 306. When the custom content stream 502 reaches the router 306, the router sends the custom content stream 502 to both the mobile phone 308 and the television 310. When the custom content stream 502 reaches the mobile phone 308, however, the content viewing interface 106 only displays one of the video content items that is included in the custom content stream in a viewport 508 of the content viewing interface 106. In the current example, the content viewing interface 106 at the mobile phone 308 only displays the video content 504 in the viewport 508. The video content 506 that is included in the custom content stream 502 is not visible in the viewport 508, even though the custom content stream 502 includes both the video content 504 and the video content 506.

The custom content stream 502 is also delivered to the television 310. The content viewing interface 106 at the television 310 only displays one of the video content items that is included in the custom content stream 502 in a viewport 510 of the content viewing interface 106. The content viewing interface 106 at the television 310 only displays the video content 506 in the viewport 510. The video content 504 that is included in the custom content stream 502 is not visible in the viewport 510, even though the custom content stream 502 includes both the video content 504 and the video content 506. Using the technique described in the example system 500, two different items of video content can be viewed simultaneously on two different devices, while the same content stream is delivered to the two different devices.

Providing two different video content items using the one custom content stream allows for immediate switching between the two video content items. This technique eliminates the need to send a request from a device to the service provider 302 through the network, wait for the request to be answered, and then process and buffer the received video content. As noted above with reference to the example described in FIG. 1, the user can select the control 112 to swap the first video content 108 that is displayed on the mobile device 102 with the second video content 110 that is displayed on the television display device 104. Using the techniques described with reference to FIG. 5 to send video content to the mobile phone 102 and to the television 104, this swap of video content can take place immediately because both sets of video content arrive at both the mobile phone 102 and the television 104 in the custom content stream 502.

If the user does choose to swap between the video content 504 and the video content 506 in the example system 500, both of the devices can move the location of their respective viewports relative to the custom content stream 502. For example, the mobile phone 308 can start with displaying the video content 504 in the viewport 508. In this example, the mobile phone 308 displays the video content 504 of the single merged video in the custom content stream 502 in the viewport 508, while not displaying the video content 506 based on a relative location of the video content 504 and the video content 506 to each other. In response to a request to swap video content, the mobile phone 308 transitions the viewport 508 so that the video content 506 is now visible and the video content 504 is removed from view. In a similar fashion, the television 310 can begin by displaying the video content 506 in the viewport 510. In response to the indication to swap video content received from the mobile phone 308, the television 310 can transition to display the video content 504 in the viewport 510 rather than the video content 506. After the mobile phone 308 and the television 310 swap which content each are displaying, both devices 308 and 310 continue to receive the custom content stream 502 that includes the video content 504 and the video content 506. Accordingly, if the user decides to switch back to the original configuration of which device displays which content, this can take place without either device having to request content, wait for content to be received, process, and buffer the respective video content for each device.

Figure 6:
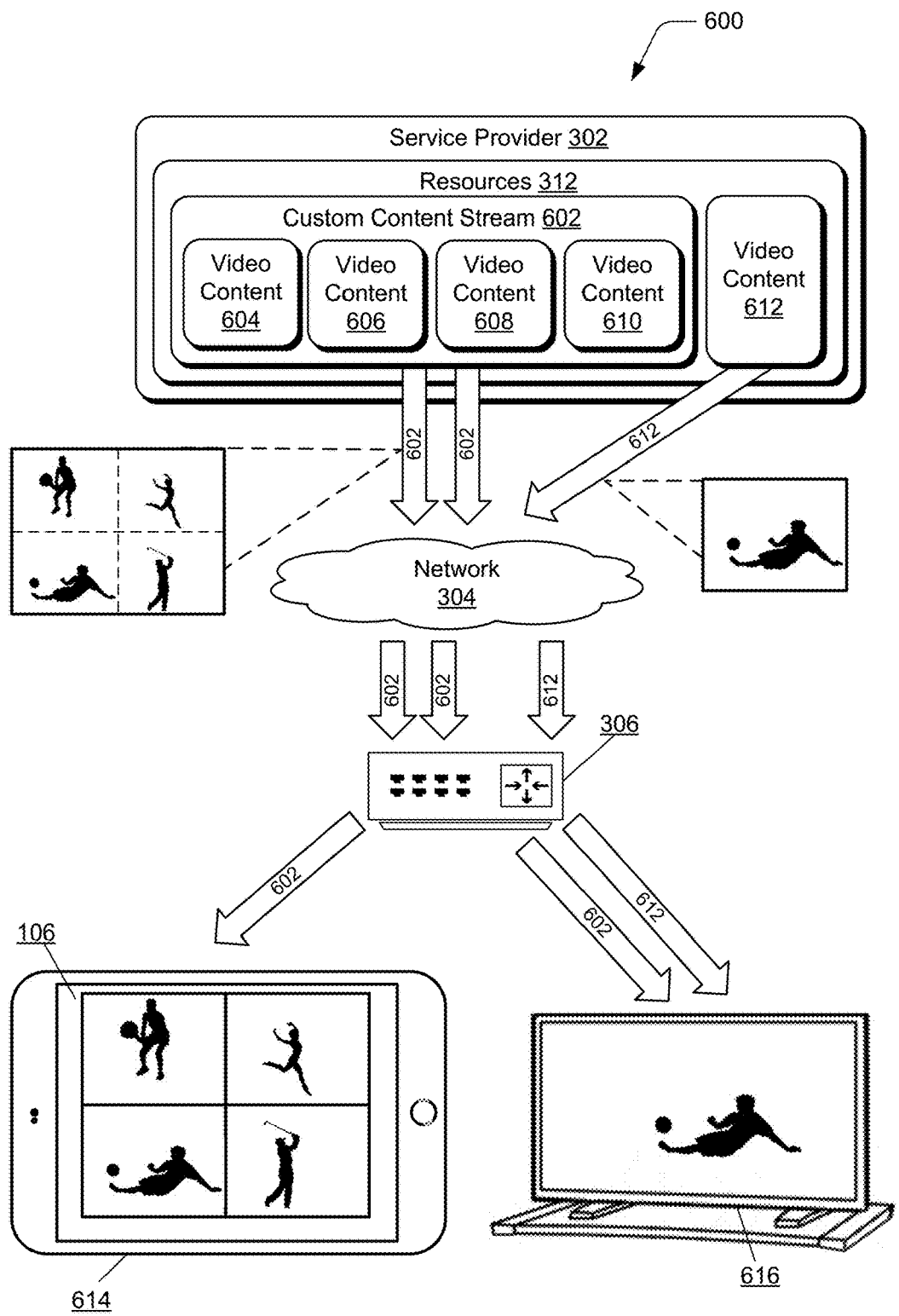

FIG. 6 illustrates another example system 600 for implementing multiple-device media swap. The example system 600 includes the service provider 302, network 304, and router device 306 as described with reference to the example system 300. The example system 600 also includes a tablet 614 and a television 616. Although a tablet and a television are detailed in the example system 600, any of the devices described herein can be implemented in the example system 600. As discussed above, the tablet 614 and the television 616 may be communicatively coupled via the router 306 and the network 304 to the service provider 302. The service provider 302 enables the tablet 614 and the television 616 to access and interact with various resources 312 made available by the service provider 302.

The resources 312 are shown as including a custom content stream 602 that includes four items of video content 604-610, along with video content 612 that is not part of the custom content stream 602. The custom content stream 602 can be generated by the service provider 302 to include four items of video content, in this case video content 604-610. Although four items of video content are described, any number of video content items are contemplated to be included in the custom content stream 602. The custom content stream 602 comprises a single merged video of the video content 604-610 together. As discussed above, merging can be implemented by stitching a frame from the video content 604 a frame of the video content 606, a frame of the video content 608, and a frame from the video content 610 together into a single frame and repeating as the frames of all of the video content items continue. The single frames that include one frame from each of the video contents 604-610 are used as the custom content stream 602. The resources 312 are also shown in the example system 600 as including a separate video content 612, which can be a different video content than the video contents 604-610.

The custom content stream 602, and the content stream that includes video content 612, are both sent from the service provider 302 via the network 304 to the router 306. The custom content stream 602 is sent to the router 306 as two content streams, while the content stream that includes the video content 612 is sent as a single stream to the router 306. When the two custom content streams 602 reach the router 306, the router sends one of the custom content streams 602 to the tablet 614 and one of the custom content streams 602 to the television 616. The content viewing interface 106 can cause the tablet 614 to display the entire custom content stream 602. This can include displaying each of the video contents 604-610 simultaneously in the content viewing interface 106 on the tablet 614. In aspects, the content viewing interface 106 can adapt a touch screen of the tablet 614 so that the tablet 614 can recognize a touch input as a selection of a particular one of the video contents 604-610.

The router 306 also sends the content stream that includes the video content 612 to the television 616. The television 616 displays the video content 612, without displaying the video contents 604-610 in from the custom content stream 602. The custom content stream 602 reaches the television 616, but is not directed to memory of the television 616. The content stream that includes the video content 612 continues on to be buffered and output on a display of the television 616. As discussed above, only storing and buffering one of the two content streams at the television 616 reduces the processing resources necessary to display the video content 612.

Figure 7:
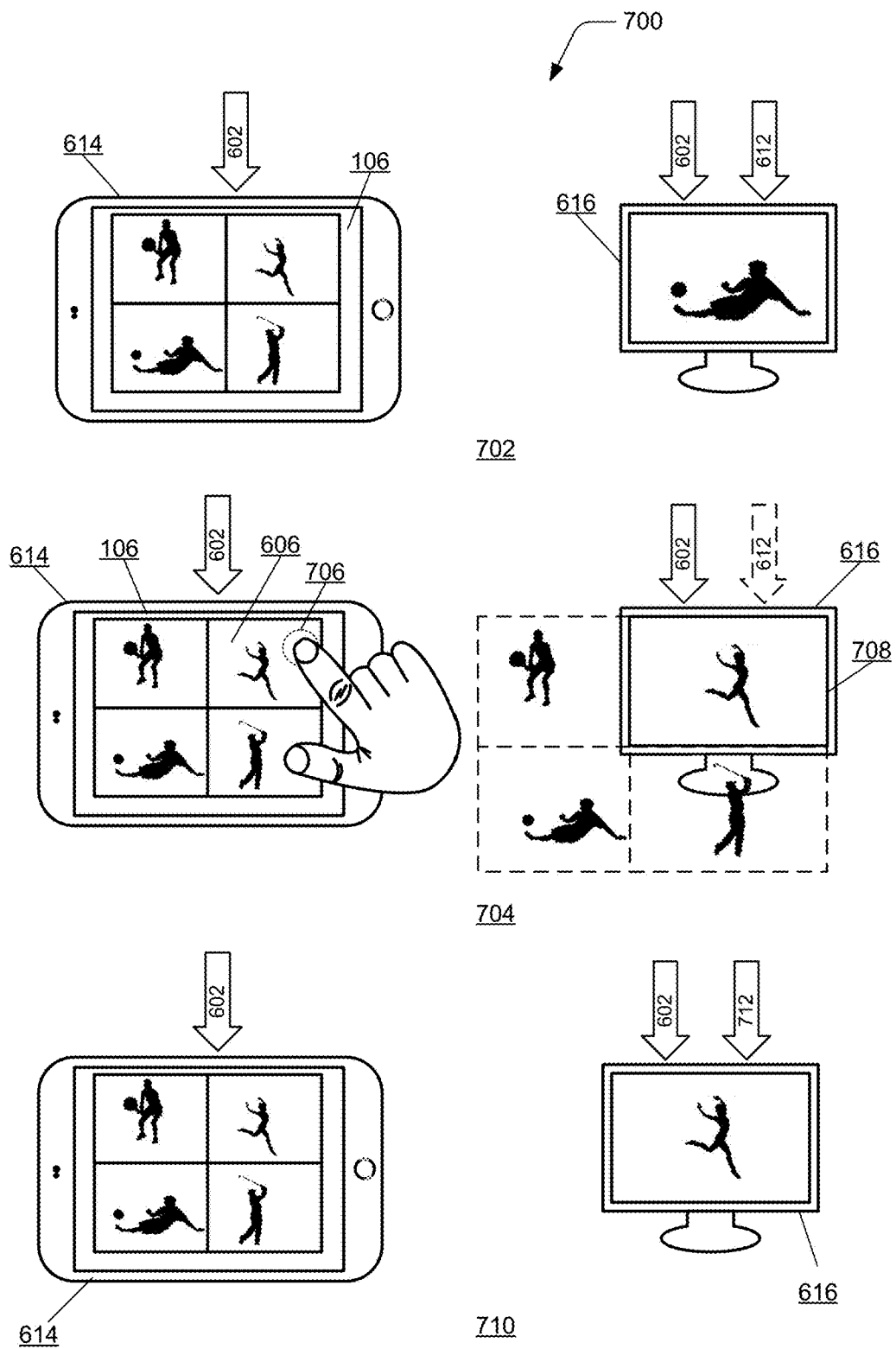

To further illustrate the swapping mechanisms involved with the multiple-device media swap of the example system 600, FIG. 7 illustrates further details of the multiple-device media swap in the example 700. The example 700 shows the tablet 614 and the television 616 of FIG. 6 at three points in time 702, 704, and 710. At the first point in time 702, the tablet 614 receives the custom content stream 602 that includes the video contents 604-610 and displays the video contents 604-610 in the content viewing interface 106. Also at the first point in time 702, the television 616 receives both the custom content stream 602, and the content stream that includes the video content 612. The television 616 only displays the video content 612 without displaying the custom content stream 602.

Arriving at the second point in time 704, a user is depicted executing a touch input 706 on the content viewing interface 106 displayed on a touch screen of the tablet 614. As discussed above, the content viewing interface 106 can adapt the touch screen of the tablet 614 so that the tablet recognizes the touch input 706 as a selection of a particular one of the video contents 604-610. In this example, the touch input 706 is shown as selecting video content 606 that includes a dancer. Upon selection of the video content 606, an indication is sent to the television 616 that a media swap has been requested.

Because the television 616 is currently receiving both the custom content stream 602 and the content stream that includes the video content 612, the television can immediately switch between the two content streams. In this case, the television 616 goes from displaying the soccer player in the video content 612, to the dancer in the video content 606.

The television 616 continues to stream the entire custom content stream 602, but a viewport 708 of the television only displays the video content 606 that was selected by the user. The other video contents 604, 608, and 610 that are part of the custom content stream 602 are hidden from view, outside of the viewport 708. Further, the content stream that includes the video content 612 may be discontinued from being delivered to the television 616 when the television 616 begins displaying the video content 606.

Meanwhile, also in response to the selection of the video content 606 on the touch screen of the tablet 614, a request is sent to the service provider 602 (not pictured). This request can include an indication to send a content stream that contains only the video content 606 to the television 616 to replace the content stream that included the video content 612. In other words, the content stream that included video content of the soccer player displayed by the television will be replaced by a new content stream that includes video content of the dancer. The replacement of the content stream that includes the soccer player video content with the content stream that includes the dancer video content occurs while the dancer is being displayed on the television as part of the custom content stream 602.

The video content 606 of the dancer that is part of the custom content stream 602 is displayed by the television 616 while the tablet 614 sends the request to the service provider 302 through the network, while the devices wait for the request to be answered, and while the television 616 processes and buffers the requested video content. Subsequently at time 710, a content stream 712 that includes the video content 606 has arrived at the television 616 and replaced the content stream that included the video content 612. Further, even though the video content 606 is still displayed on the television 614, the source of the video content is now the content stream 712 rather than the custom content stream 602. Both the tablet 614 and the television 616 continue to receive and display video content included in the custom content stream 602, in the event that the user decides to again swap to a different video content for display on the television.

This process of displaying the video content 606 of the custom content stream 602 while the devices are sending a request and waiting for additional content to be ready for display provides a number of advantages. In one example, the content stream that includes the video content 612 may be sent by the service provider 302 at a particular resolution, such as 1080p. The custom content stream 602 can also be created at the service provider 302 in 1080p. However, if the four video contents 604-610 are arranged in a 2×2 configuration when they are merged together to form the custom content stream 602, this can result in the four individual video contents being 540p each. Therefore, when the four video contents 604-610 are displayed on the tablet 614, each of the four video contents are displayed at 540p to form the single merged video displayed at 1080p.

Consider again the point in time 704 when the user has selected the video content 606 on the touch screen of the tablet 614. When the television 616 receives the indication to swap to the video content 606, the television 616 switches from displaying the video content 612 to display the video content 606 that is part of the custom content stream 602. The television 616, like the tablet 614, receives the merged video in the custom content stream 602 in 1080p, with each of the video contents 604-610 in 540p. When the television 616 switches to display the video content 606 in the viewport 708, the video content 606 is therefore displayed in 540p.

At the final point in time 710, the television 616 receives the content stream 712 that includes the video content 606 at 1080p. The content stream 712 has replaced the content stream that included the video content 612 at 1080p. The replacement of the content stream that included the video content 612 with the content stream 712 likely took several seconds, which would otherwise be easily noticeable and bothersome to users. But immediately inserting the video content 606 from the custom content stream 602 that is already present at the television 616 in response to the request to swap from one media item to another alleviates these problems. The video content that the user has requested at the tablet 614 can be displayed instantaneously at the television 616, and the user does not need to wait for the request to be sent and the content to be received, processed, and buffered. Even though the video content 606 is displayed at a lower resolution as part of the custom content stream 602, the difference in resolution is likely undetectable in the amount of time that the television 616 waits to receive the video content at the higher resolution. Once the television 616 receives the content stream 712 that includes the video content 606, the television 616 can process and buffer the video content 606 accordingly. Then, the video content 606 that is at the higher resolution from the content stream 712 can be inserted seamlessly as a next-frame following the corresponding previous frame of the video content 606 at the lower resolution.

Figure 8:
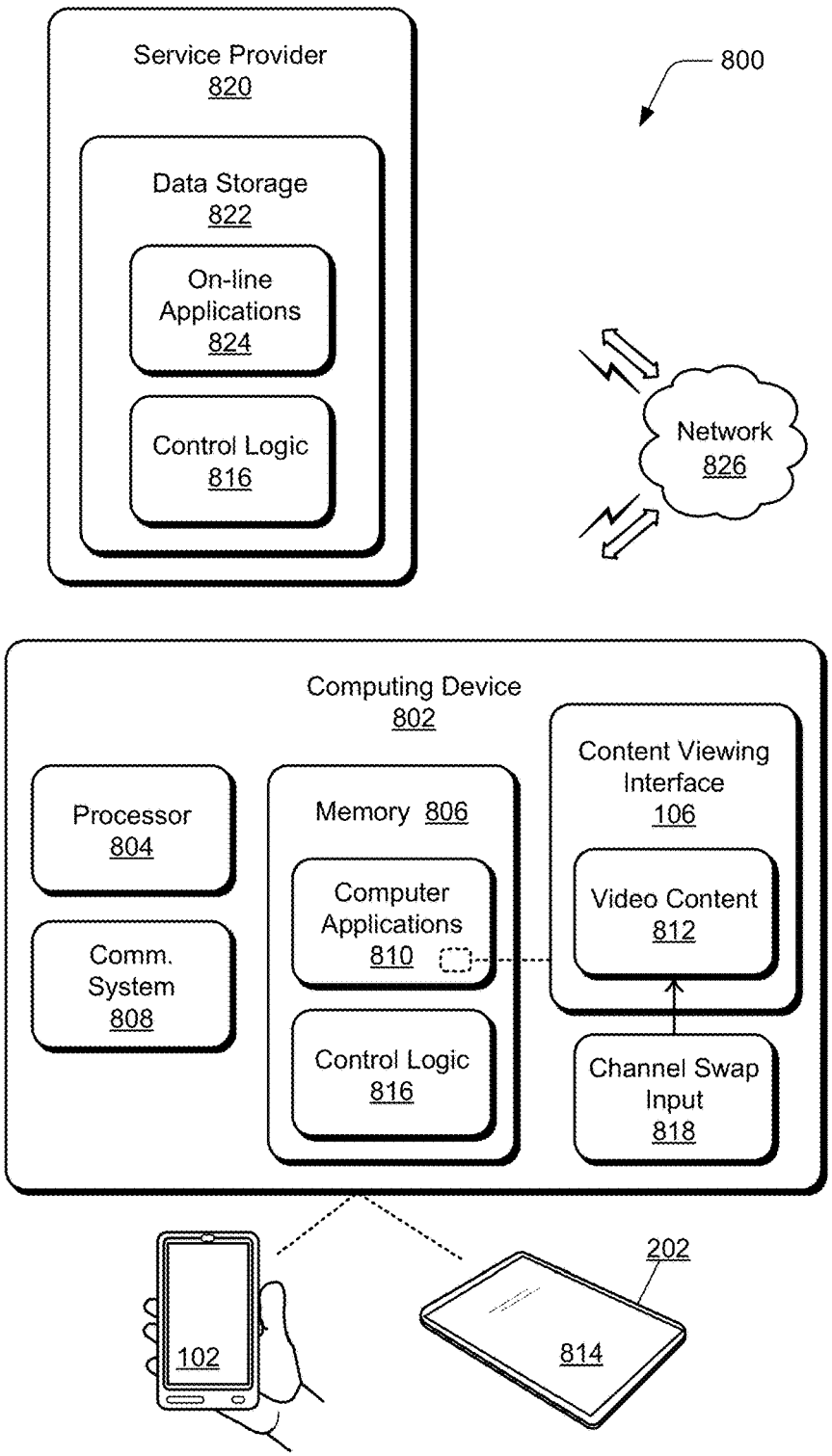
FIG. 8 illustrates an example system in which aspects of multiple-device media swap can be implemented as described herein.

FIG. 8 illustrates an example system 800 in which aspects of multiple-device media swap can be implemented. The example system 800 includes a computing device 802, such as the mobile device 102 and/or 308; the tablet device 202 and/or 614; and/or the television 104, 204, 310, and/or 616 shown in FIGS. 1-7, or any other type of a mobile phone, media playback, computing, communication, gaming, entertainment, portable electronic media device, or computer device. The computing device 802 can be implemented with various components, such as a processor 804 (or processing system) and memory 806, and with any number and combination of different components as further described with reference to the example device shown in FIG. 10. Although not shown, the computing device 802 can include a power source, such as a battery, to power the various device components. Further, the computing device 802 can include different wireless radio systems, such as for Wi-Fi, Bluetooth™, Mobile Broadband, LTE, or any other wireless communication system or format. Generally, the computing device 802 implements a communication system 808 that includes a radio device, antenna, and chipset that is implemented for wireless communication with other devices, networks, and services.

The computing device 802 includes one or more computer applications 810 that generate the content viewing interface 106, which includes video content 812 for display on a display device 814 of the computing device, as referred to above. The computer applications 810 can include many different types of computer applications that utilize or implement multiple-device media swap features or functions, which provide for displaying, playing, pausing, rewinding, recording, and/or editing video content, such as in video applications for consuming digital content, social networking, artistic uses, commercial and private uses, etc.

Any of the different types of computer applications can include the control logic 816 that implements aspects of multiple-device media swap, as illustrated and described above with reference to FIGS. 1-7. The control logic 816 can be implemented as a software application or module, such as computer-executable software instructions that are executable with the processor 804 (or with a processing system) to implement aspects described herein. The control logic 816 can be stored on computer-readable storage memory (e.g., the device memory 806), such as any suitable memory device or electronic data storage implemented in the computing device. Although shown as a separate module or component in memory 806, the control logic 816 may be integrated as a module or component with any of the computer applications 810 for multiple-device media swap in the object layout interface 104.

As described with reference to FIGS. 1-7, the control logic 816 is implemented to receive media swap input 818 (e.g., a user input via the content viewing interface) that controls different video content 812 to be displayed in the content viewing interface 106. The control logic 816 controls the display of different video content 812 based on a combination of the format in which the video content is received, a number of video contents that are received, a number and type of devices that receive the video content, and user inputs intended to configure what video content is displayed and how the video content is displayed, among other considerations.

In implementations, the control logic 816 is configured to recognize two (or more) content streams that are being received at the computing device 802. When the control logic 816 recognizes the content streams, the control logic can determine which of the video content included in the content streams to display in the content viewing interface 106 of the computing device 802. The control logic may also be configured to control which of the video content included in the content streams to display on an additional device. In addition to controlling which of the video contents to display on which device, the control logic can control how the video content is displayed, based on a type of device that is displaying the video content for instance. When a media swap input 818 is received, the control logic can switch from video content in one content stream to another video content in another content stream to be displayed on the display device 814. The control logic may send indications to the additional devices to swap between the video contents, or may have control to cause the additional devices to swap between the video contents that the additional devices are displaying.

In implementations, the control logic 816 is also configured to recognize a single content stream that is being received at the computing device 802, where the single content stream has two (or more) video contents included in the single stream. When the control logic 816 recognizes the single content stream that has multiple video contents within the single content stream, the control logic can determine which of the multiple video contents to display in a viewport of the content viewing interface 106. The control logic 816 may also direct which of the multiple video contents included in the single content stream to display in a viewport of an additional device. In addition to controlling which of the video contents to display on which device, the control logic can control how the video content is displayed, based on a type of device that is displaying the video content for instance. In some scenarios, the control logic 816 can direct a device to display all of the video contents in the single stream in a viewport simultaneously, such as is performed by the tablet 614 in FIGS. 6 and 7. When a media swap input 818 is received, the control logic can switch from displaying one of the video contents in the viewport to another of the video contents in the viewport, such as by translating a location of the viewport relative to the arrangement of the multiple video contents in the single content stream. The control logic may send indications to the additional devices to swap between the video contents, or may have control to cause the additional devices to swap between the video contents that the additional devices are displaying.

In implementations, the control logic 816 is further configured to provide combinations of the described techniques for a desired viewing experience. In one example, the control logic 816 can recognize a single content stream having multiple video contents that is sent to two different devices, and another content stream having only one video content being sent to one of the multiple devices. In this case, the control logic can display the multiple video contents in the single content stream on a device such as the tablet 202, and cause the content viewing interface 106 to enable selection of the multiple video contents within the content viewing interface. The control logic can also direct an additional device, such as a television, that receives both content streams to initially display the content stream that includes the single video content. When the tablet 202 receives a media swap input 818 by selection of one of the multiple video contents, the control logic 816 instructs the television to swap to the content stream that includes the multiple video contents. The control logic also instructs the television to only display the selected video content in a viewport of the content viewing interface at the television. Meanwhile, the control logic sends a request to the service provider 820 to send another content stream to the television that includes only the selected video content, but at a higher resolution than the selected video content appears in the content stream having multiple video contents. When the content stream with the selected video content arrives at the television and is ready for display, the control logic 816 swaps from displaying the multiple video content stream to the single video content stream seamlessly. Other combinations of the described techniques for multiple-device media swap are also contemplated.

The example system 800 can also include a service provider 820, that is accessible by client devices, to include the computing device 802, the mobile phone 102, and the tablet 202. The service provider 820 includes data storage 822 that may be implemented as any suitable memory, memory device, or electronic data storage for network-based data storage. The data storage can maintain an instance of the control logic 816, which controls operations of the service provider 820, such as responding to requests from client devices, maintaining media content, and so forth. The data storage 822 can also maintain on-line applications 824 (e.g., as network-based applications), that are accessible by a computer application 810 from the computing device 802. The on-line applications 824 can include video streaming applications such as YouTube™, content storage applications that store a user's private or public media content, social media applications that provide media content consumption, live-streaming video applications, and so on. Generally, the on-line applications 824 can provide users with a sources of consumable media content that is accessible by the computing device 802 via a network 826.

The service provider 820 can also be implemented with server devices that are representative of one or multiple hardware server devices of the service provider. Further, the service provider 820 can be implemented with various components, such as a processing system and memory, as well as with any number and combination of differing components as further described with reference to the example device shown in FIG. 10 to implement the services, applications, servers, and other features of multiple-device media swap.

The example system 800 also includes the network 826, and any of the devices, servers, and/or services described herein can communicate via the network, such as for data communication between the computing device 802 and the service provider 820. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Example Method

Example method 900 is described with reference to FIG. 9 in accordance with one or more aspects of multiple-device media swap, and is generally described with reference to the control logic 816 implemented by the computing device as shown in the example system of FIG. 8. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 9:
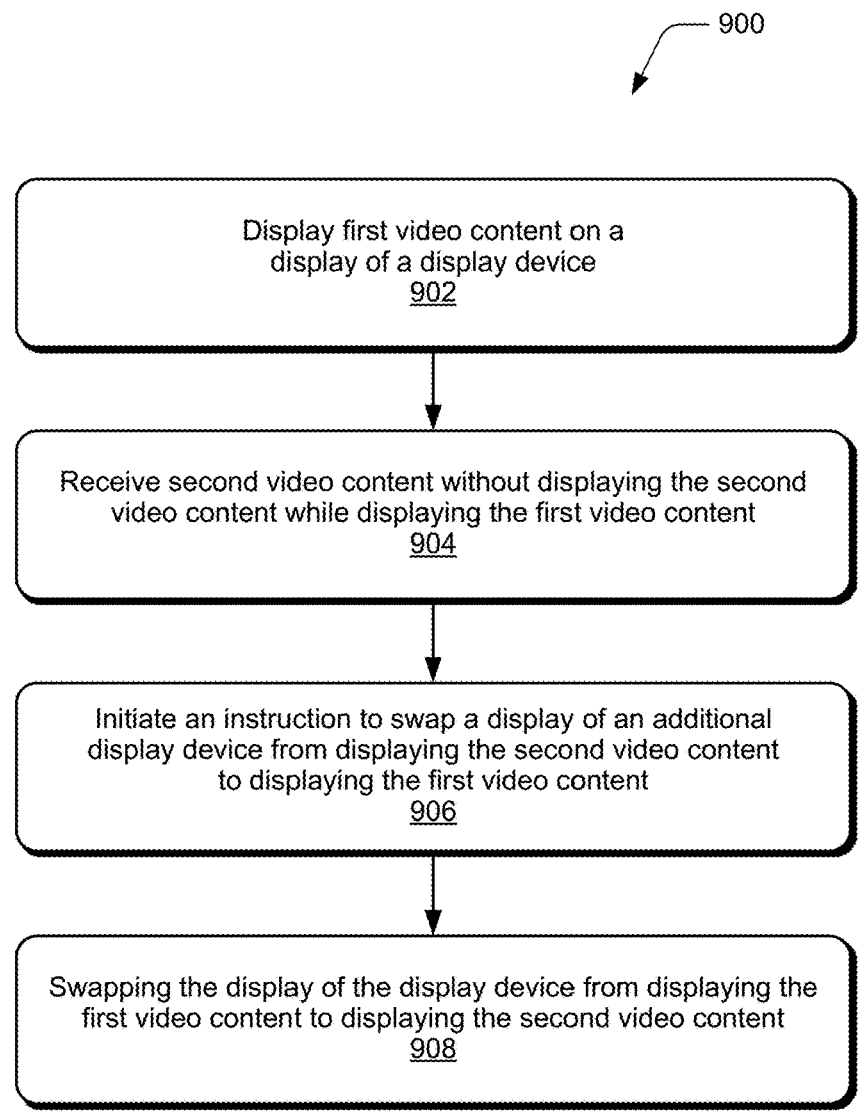
FIG. 9 illustrates an example method of multiple-device media swap in accordance with techniques described herein.

FIG. 9 illustrates example method(s) 900 of multiple-device media swap. The order in which the method is described is not intended to be construed as a limitation, and any number or combination of the method operations can be combined in any order to implement a method, or an alternate method.

At 902, a device that is currently receiving two videos through one or more content streams, and also is currently presenting a first of the two videos, determines that another device is currently presenting a second of the two videos. The other device is currently receiving both of the two videos through the one or more content streams or through another content stream. For example, the first of the two videos may be displayed on the mobile device 102 of FIG. 1, and/or on the mobile phone 308 shown in FIGS. 3-5. Alternatively or additionally, the first of the two videos may be displayed on the tablet 614 shown in FIGS. 6 and 7, or on any other suitable type of computing device. The device can display the first of the two videos within a content viewing interface 106 of a computer application that is implemented by the device. The control logic 816 can customize the content viewing interface 106 to display the first of the two videos, and can customize functionalities available for interaction with the two videos, based on a particular display device that is implementing the content viewing interface 106 and the format of the video content.

Additionally, the second of the two videos may be displayed on the television display device 104 of FIG. 1, and/or the television 310 shown in FIGS. 3-5. Alternatively or additionally, the second of the two videos may be displayed on the display device 616 shown in FIGS. 6 and 7, or on any other suitable type of computing device. The other device can display the second of the two videos within a content viewing interface 106 of a computer application that is implemented by the other device. The control logic 816 can customize the content viewing interface 106 to display the second of the two videos, and can customize functionalities available for interaction with the two videos, based on a particular display device that is implementing the content viewing interface 106 and the format of the video content.

In one example, the device receives the two videos in a single content stream, where the two videos have been merged together into a single merged video, such as is described with reference to FIG. 5. The device can present the first video in a viewport of the device, without presenting the second video within the viewport. In this example, the device can determine that the other device is presenting the second video based on the device presenting the first of the two videos. In other words, the device knows which video it is presenting, and therefore can determine that the other device is presenting the second of the two videos that the device receives but is not presenting.

In another example, the device receives the two videos in two different content streams, where a first content stream includes the first of the two videos and a second content stream includes the second of the two videos, such as is described with reference to FIG. 3. The device can present the first of the two videos on a display, without presenting the second of the two videos on the display. However, the device continues to receive both content streams, and thus continues to receive both videos, despite the second of the two videos not being presented. In this example, the device can determine that the other device is presenting the second video based on the device presenting the first of the two videos included in the first content stream. In other words, the device knows which video it is presenting, and therefore can determine that the other device is presenting the second of the two videos that the device receives but is not presenting.

In still one further example, the device can determine that the other device is presenting the second video based on the device sending an instruction to the other device to present the second video before the other device presents either of the two videos. In this way, the device controls which of the two videos the other device is presenting, and has knowledge of which of the two videos the other device is presenting.

At 904, the device receives an instruction to swap content presentation between the device and the other device. For example, the instruction to swap may include receiving a user input at a user-selectable control at the device and sending an indication from the device to the additional display device, such as is described in relation to user-selectable control 112 and indication 114 of FIG. 1. In another example, the instruction to swap may include receiving a touch input on an item of video content that is being displayed in a touch interface of the device and sending an indication from the device to the additional display device, such as is described in relation to the selection of video content item 208(*d*) and indication 212 of FIG. 2.

At 906, responsive to the instruction to swap content presentation, the device presents the second of the two videos and ceases to present the first of the two videos. Additionally in response to the instruction to swap content presentation, at 908 the device causes the other device to present the first of the two videos and cease to present the second of the two videos. The presenting at 906 and the causing at 908 are effective to simultaneously swap presentation of the two videos between the device and the other device.

Consider the first example described at step 902 in which the device receives the two videos as a single merged video. The device can initiate the swap by translating a location of the viewport 508 in relation to the arrangement of the first video content and the second video content as part of the single content stream. Further, consider again the second example described at step 902 in which the device receives the two videos in two respective content streams. When the instruction to swap is received, the device can switch from presenting the first of the two videos to the second of the two videos by switching which content stream is processed and buffered for display. Particularly, when a request to swap is received, the device is able to terminate processing and buffering the first video at the next frame that was going to be processed and buffered. Then, the device replaces the first video with the second video at the next frame of the second video that is received, and begins processing and buffering the second video for display on the device. Similarly, the other device terminates processing and buffering of the second video at the next frame that was going to be processed and buffered at the other device when the other device receives the indication to swap. Then, the other device replaces the second video with the first video at the next frame of the first video that is received, and begins processing and buffering the first video for display on the other device.

Example Device

Figure 10:
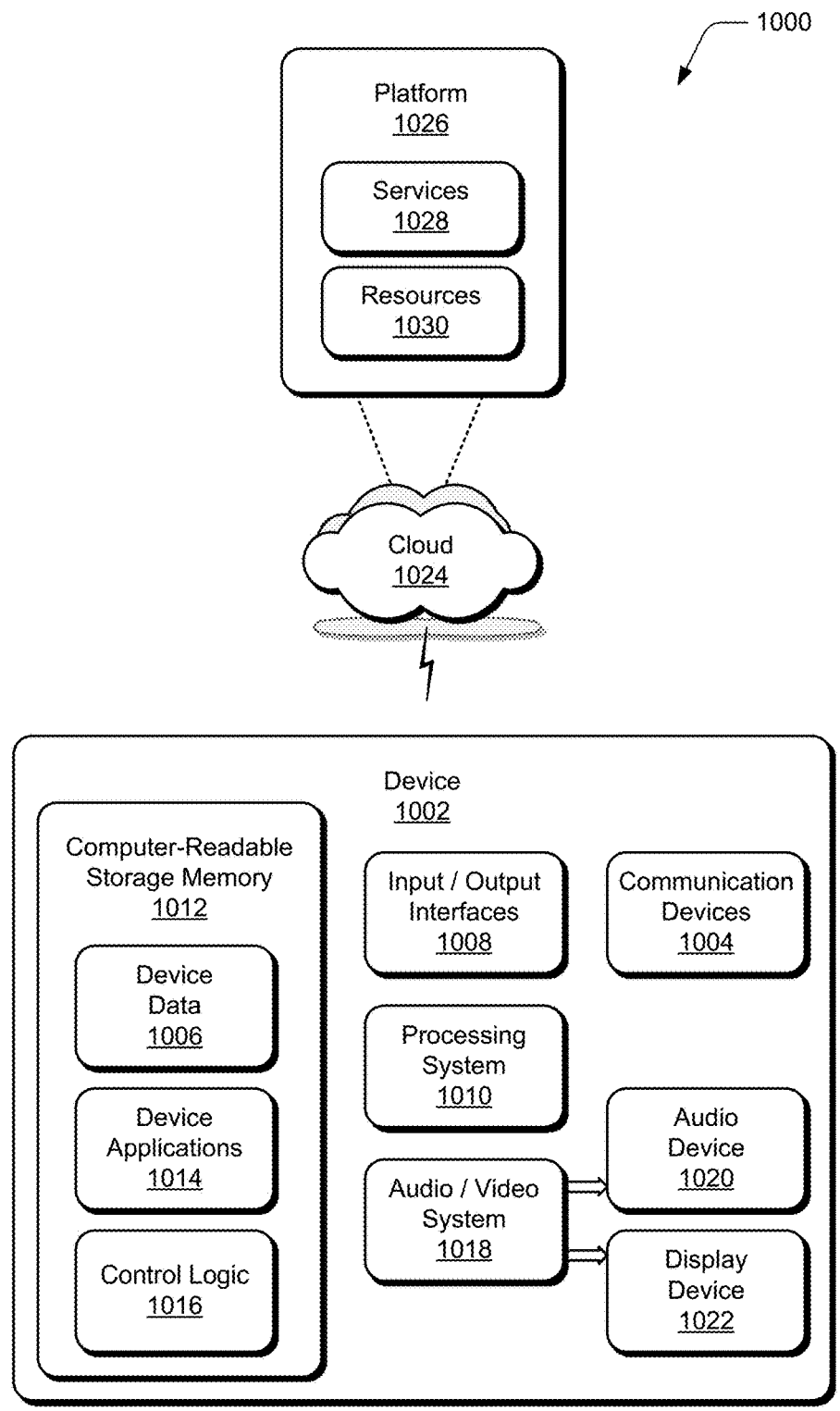
FIG. 10 illustrates an example system with an example device that can implement multiple-device media swap as described herein.

FIG. 10 illustrates an example system 1000 that includes an example device 1002, which can implement aspects of multiple-device media swap. The example device 1002 can be implemented as any of the computing devices and/or services (e.g., server devices) described with reference to the previous FIGS. 1-9, such as any type of computing device, client device, mobile phone, tablet, communication, entertainment, gaming, media playback, and/or other type of device. For example, the mobile device 102 and/or 308; the tablet 202 and/or 614; the television display device 104, 204, 310, and/or 616; the computing device 802; and/or server devices of the service provider 820 may be implemented as the example device 1002.

The device 1002 includes communication devices 1004 that enable wired and/or wireless communication of device data 1006, such as video content data and computer applications content that is transferred from one computing device to another, and/or synched between multiple computing devices. The device data can include any type of audio, video, image, and/or graphic data that is generated by applications executing on the device. The communication devices 1004 can also include transceivers for cellular phone communication and/or for network data communication.

The device 1002 also includes input/output (I/O) interfaces 1008, such as data network interfaces that provide connection and/or communication links between the device, data networks, and other devices. The I/O interfaces can be used to couple the device to any type of components, peripherals, and/or accessory devices, such as a digital camera device that may be integrated with device 1002. The I/O interfaces also include data input ports via which any type of data, media content, and/or inputs can be received, such as user inputs to the device, as well as any type of audio, video, and/or image data received from any content and/or data source.

The device 1002 includes a processing system 1010 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1002 may further include any type of a system bus or other data and command transfer system that couples the various components within the device. A system bus can include any one or combination of different bus structures and architectures, as well as control and data lines.

The device 1002 also includes computer-readable storage memory 1012, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 1012 provides storage of the device data 1006 and various device applications 1014, such as an operating system that is maintained as a software application with the computer-readable storage memory and executed by the processing system 1010. In this example, the device applications also include various computer applications and control logic 1016 that implements aspects of multiple-device media swap, such as when the example device 1002 is implemented as the computing device 802 shown in FIG. 8. Examples of the control logic 1016 includes the control logic 816 that is implemented by the computing device 802 and/or by the service provider 820, as described with reference to FIG. 8.

The device 1002 also includes an audio and/or video system 1018 that generates audio data for an audio device 1020 and/or generates display data for a display device 1022. The audio device and/or the display device include any devices that process, display, and/or otherwise render audio, video, display, and/or image data, such as the image content of a digital photo. In implementations, the audio device and/or the display device are integrated components of the example device 1002. Alternatively, the audio device and/or the display device are external, peripheral components to the example device. In aspects, at least part of the techniques described for multiple-device media swap may be implemented in a distributed system, such as over a "cloud" 1024 in a platform 1026. The cloud 1024 includes and/or is representative of the platform 1026 for services 1028 and/or resources 1030. For example, the services 1028 may include the service provider 820 described with reference to FIG. 8.

The platform 1026 abstracts underlying functionality of hardware, such as server devices (e.g., included in the services 1028) and/or software resources (e.g., included as the resources 1030), and connects the example device 1002 with other devices, servers, etc. The resources 1030 may also include applications and/or data that can be utilized while computer processing is executed on servers that are remote from the example device 1002. Additionally, the services 1028 and/or the resources 1030 may facilitate subscriber network services, such as over the Internet, a cellular network, or Wi-Fi network. The platform 1026 may also serve to abstract and scale resources to service a demand for the resources 1030 that are implemented via the platform, such as in an interconnected device aspect with functionality distributed throughout the system 1000. For example, the functionality may be implemented in part at the example device 1002 as well as via the platform 1026 that abstracts the functionality of the cloud 1024.

Although aspects of multiple-device media swap have been described in language specific to features and/or methods, the appended claims are not necessarily limited to the specific features or methods described. Rather, the specific features and methods are disclosed as example implementations of multiple-device media swap, and other equivalent features and methods are intended to be within the scope of the appended claims. Further, various different aspects are described and it is to be appreciated that each described aspect can be implemented independently or in connection with one or more other described aspects.

What is claimed is:

1. A method for swapping content presentation, the method comprising:
    determining, at a device currently receiving two videos having different items of content through a content stream comprising frames of the two videos stitched into single, respective frames of a merged video and currently presenting a first of the two videos, that another device is currently presenting a second of the two videos and is currently receiving both of the two videos through the content stream;
    receiving an instruction, at the device, to swap content presentation between the device and the other device; and
    responsive to the instruction to swap content presentation:
        presenting, at the device, the second of the two videos and ceasing to present the first of the two videos; and
        causing the other device to present the first of the two videos and cease to present the second of the two videos.

2. The method as recited in claim 1, further comprising, prior to the determining, requesting, by the device, the two videos and indicating in the request that the device intends to present the first of the two videos or requests that the other device present the second of the two videos, and wherein the determining is based on the indication in the request.

3. The method as recited in claim 1, wherein the determining is based on the device receiving an indication, from the other device or from a service provider of the content stream, that the other device is presenting the second video.

4. The method as recited in claim 1, wherein the presenting and the causing are effective to simultaneously swap presentation of the two videos between the device and the other device.

5. The method as recited in claim 1, wherein the device receives the two videos via wireless communication with a router device of a wireless network that communicatively links the device, the other device, and the router device.

6. A mobile device implemented for swapping content presentation with another device, the mobile device comprising:
an integrated display configured to present content; and
a memory and processor system configured to execute a content display application that is implemented to:
receive, concurrently, two videos having different items of content through a content stream comprising frames of the two videos stitched into single, respective frames of a merged video;
present a first of the two videos on the integrated display;
determine that another device is currently presenting a second of the two videos and is currently receiving both of the two videos through the content stream;
receive an instruction, at the mobile device, to swap content presentation between the mobile device and the other device; and
responsive to the instruction to swap content presentation:
present, at the mobile device, the second of the two videos and ceasing to present the first of the two videos; and
cause the other device to present the first of the two videos and cease to present the second of the two videos.

7. The mobile device as recited in claim 6, wherein the content display application is further implemented to, prior to receiving the two videos, request, by the mobile device, the two videos and indicating in the request that the mobile device intends to present the first of the two videos or requests that the other device present the second of the two videos, and wherein the determining is based on the indication in the request.

8. The mobile device as recited in claim 6, wherein the determining is based on the mobile device receiving an indication, from the other device or from a service provider of the content stream, that the other device is presenting the second video.

9. The mobile device as recited in claim 6, wherein the presentation of the second of the two videos and the causation of the other device to present the first of the two videos are effective to simultaneously swap presentation of the two videos between the mobile device and the other device.

10. The mobile device as recited in claim 6, wherein the content display application is further implemented to adapt based on characteristics and capabilities of the mobile device to control display of the two videos.

11. A display device implemented for swapping content presentation with another device, the display device configured to:
determine, at the display device currently receiving two videos having different items of content through a content stream comprising frames of the two videos stitched into single, respective frames of a merged video and currently presenting a first of the two videos, that the other device is currently presenting a second of the two videos and is currently receiving both of the two videos through the content stream;
receive an instruction, at the display device, to swap content presentation between the display device and the other device; and
responsive to the instruction to swap content presentation:
present, at the display device, the second of the two videos and ceasing to present the first of the two videos; and
cause the other device to present the first of the two videos and cease to present the second of the two videos.

12. The display device as recited in claim 11, wherein the display device is further configured to, prior to the determination, request, by the display device, the two videos and indicating in the request that the display device intends to present the first of the two videos or requests that the other device present the second of the two videos, and wherein the determining is based on the indication in the request.

13. The display device as recited in claim 11, wherein the determining is based on the mobile device receiving an indication, from the other device or from a service provider of the content stream, that the other device is presenting the second video.

14. The display device as recited in claim 11, wherein the presentation of the second of the two videos and the causation of the other device to present the first of the two videos are effective to simultaneously swap presentation of the two videos between the display device and the other device.

15. The display device as recited in claim 11, wherein the display device receives the two videos via wireless communication with a router device of a wireless network that communicatively links the display device, the other device, and the router device.

16. The method as recited in claim 1, wherein a viewport on an integrated display of the device limits a display of the content stream to the first video as the device is presenting the first video.

17. The method as recited in claim 1, wherein a viewport on an integrated display of the device limits a display of the content stream to the second video as the device is presenting the second video.

18. The display device as recited in claim 11, wherein the instruction to swap content presentation is received in response to a control of the display device being selected.

19. The method as recited in claim 1, wherein presenting the second of the two videos and ceasing to present the first of the two videos includes transitioning a viewport so that the second of the two videos is visible and the first of the two videos is removed from view.

20. The method as recited in claim 19, wherein the other device is caused to present the first of the two videos and cease presenting the second of the two videos via an indication received via a signal from the device.

* * * * *